United States Patent
Chai et al.

(10) Patent No.: US 11,893,670 B2
(45) Date of Patent: Feb. 6, 2024

(54) ANIMATION GENERATION METHOD, APPARATUS AND SYSTEM, AND STORAGE MEDIUM

(71) Applicants: MOFA (SHANGHAI) INFORMATION TECHNOLOGY CO., LTD., Shanghai (CN); SHANGHAI MOVU TECHNOLOGY CO., LTD., Shanghai (CN)

(72) Inventors: Jinxiang Chai, Shanghai (CN); Wenping Zhao, Shanghai (CN); Shihao Jin, Shanghai (CN); Bo Liu, Shanghai (CN); Tonghui Zhu, Shanghai (CN); Hongbing Tan, Shanghai (CN); Xingtang Xiong, Shanghai (CN); Congyi Wang, Shanghai (CN); Zhiyong Wang, Shanghai (CN)

(73) Assignees: Mofa (Shanghai) Information Technology Co., Ltd., Shanghai (CN); Shanghai Movu Technology Co., Ltd., Shanghai (CN)

( * ) Notice: Subject to any disclaimer, the term of this patent is extended or adjusted under 35 U.S.C. 154(b) by 0 days.

(21) Appl. No.: 18/028,472

(22) PCT Filed: Aug. 3, 2021

(86) PCT No.: PCT/CN2021/110349
§ 371 (c)(1),
(2) Date: Mar. 24, 2023

(87) PCT Pub. No.: WO2022/062680
PCT Pub. Date: Mar. 31, 2022

(65) Prior Publication Data
US 2023/0274484 A1  Aug. 31, 2023

(30) Foreign Application Priority Data
Sep. 25, 2020 (CN) .......................... 202011023780.3

(51) Int. Cl.
*G06T 13/00* (2011.01)
*G06T 7/73* (2017.01)
(Continued)

(52) U.S. Cl.
CPC .............. *G06T 13/00* (2013.01); *G06T 7/248* (2017.01); *G06T 7/74* (2017.01); *G06V 20/46* (2022.01);
(Continued)

(58) Field of Classification Search
CPC ............ G06T 13/00; G06T 7/74; G06T 7/248
See application file for complete search history.

(56) References Cited

U.S. PATENT DOCUMENTS 8,854,376 B1    10/2014   Bhat et al.
10,650,564 B1 *   5/2020   Lin ..................... G06F 18/2413
(Continued)

FOREIGN PATENT DOCUMENTS

CN    107274464 A    10/2017
CN    107274466 A    10/2017
(Continued)

OTHER PUBLICATIONS

The International Search Report dated Oct. 28, 2021, for Application No. PCT/CN2021/110349 (five (5)pages).
(Continued)

*Primary Examiner* — Yi Yang
(74) *Attorney, Agent, or Firm* — KDW Firm PLLC

(57) ABSTRACT

Provided are an animation generation method, apparatus, and system and a storage medium, relating to the field of animation technology. The method includes acquiring the real feature data of a real object, where the real feature data includes the action data and the face data of the real object during a performance process; determining the target feature data of a virtual character according to the real feature data,
(Continued)

where the virtual character is a preset animation model, and the target feature data includes the action data and the face data of the virtual character; and generating the animation of the virtual character according to the target feature data. The performance of the real object is used for generating the animation of the virtual character.

15 Claims, 3 Drawing Sheets

(51) Int. Cl.
  *G06T 7/246* (2017.01)
  *G06V 40/16* (2022.01)
  *G06V 20/40* (2022.01)
  *G06V 40/20* (2022.01)

(52) U.S. Cl.
  CPC ............ *G06V 40/174* (2022.01); *G06V 40/20* (2022.01); *G06T 2207/10016* (2013.01); *G06T 2207/30201* (2013.01); *G06T 2207/30204* (2013.01)

(56) References Cited

U.S. PATENT DOCUMENTS

| | | | | |
|---|---|---|---|---|
| 2004/0155962 | A1* | 8/2004 | Marks | G06T 7/248 348/169 |
| 2006/0181535 | A1* | 8/2006 | Watt | A63F 13/63 345/473 |
| 2010/0007665 | A1* | 1/2010 | Smith | G06T 13/40 345/473 |
| 2013/0135315 | A1* | 5/2013 | Bares | G11B 27/031 345/473 |
| 2017/0091976 | A1 | 3/2017 | O'Sullivan et al. | |
| 2019/0004639 | A1 | 1/2019 | Faulkner | |
| 2019/0082211 | A1* | 3/2019 | Vats | G06T 7/215 |

FOREIGN PATENT DOCUMENTS

| | | |
|---|---|---|
| CN | 108564642 A | 9/2018 |
| CN | 110517337 A | 11/2019 |
| CN | 110599573 A | 12/2019 |
| CN | 110650354 A | 1/2020 |
| CN | 111968207 A | 11/2020 |

OTHER PUBLICATIONS

The First Office Action dated Feb. 22, 2021 of prior application No. 202011023780.3 (12 pages).
The Second Office Action dated Jun. 16, 2021 of prior application No. 202011023780.3 (14 pages).

* cited by examiner

ID AND SYSTEM, AND STORAGE
ANIMATION GENERATION METHOD, APPARATUS AND SYSTEM, AND STORAGE MEDIUM

CROSS-REFERENCE TO RELATED APPLICATIONS

This is a National Stage Application filed under 35 U.S.C. 371 based on International Patent Application No. PCT/CN2021/110349, filed on Aug. 3, 2021, which claims priority to Chinese Patent Application No. 202011023780.3 filed on Sep. 25, 2020, disclosures of both of which are incorporated herein by reference in their entireties.

TECHNICAL FIELD

The present disclosure relates to the field of animation technology and, in particular, to an animation generation method, apparatus, and system and a storage medium.

BACKGROUND

During animation production, complex production tasks of many animations have to be completed in a highly condensed timetable. A conventional animation production flow is a typical linear flow, similar to a production line, including an early stage, a middle stage, and a later stage. The animation production effect is limited by the drawing level and efficiency of an animator.

Compared with the conventional production flow, the use of a virtual production animation becomes a mainstream mode. The technical requirements of the virtual production animation are also greatly increased in various aspects. Regarding how to use the virtual production animation to improve the animation production efficiency and ensure the animation production effect, a reasonable and effective technical solution is not provided in the related art.

SUMMARY

In view of this, the present disclosure provides an animation generation method, apparatus, and system and a storage medium. The technical solution is described below.

According to an aspect of the present disclosure, an animation generation method is provided. The method includes the steps below.

The real feature data of a real object is acquired. The real feature data includes the action data and the face data of the real object during a performance process.

The target feature data of a virtual character is determined according to the real feature data. The virtual character is a preset animation model. The target feature data includes the action data and the face data of the virtual character.

The animation of the virtual character is generated according to the target feature data.

In a possible implementation, the method also includes the steps below.

Reference data is acquired. The reference data includes the voice recording data and/or the virtual camera position and attitude data of the real object during the performance process.

The animation of the virtual character is generated according to the target feature data in the manner below.

The animation of the virtual character is generated according to the target feature data and the reference data.

In another possible implementation, the target feature data carries a time code, and the reference data carries a time code. The animation of the virtual character is generated according to the target feature data and the reference data in the manners below.

The target feature data and the reference data are aligned according to the time code corresponding to the target feature data and the time code corresponding to the reference data.

The animation of the virtual character is generated according to the aligned target feature data and the aligned reference data.

In another possible implementation, the animation of the virtual character is generated according to the aligned target feature data and the aligned reference data in the manners below.

An animation image is obtained according to the virtual camera position and attitude data and the target feature data after alignment processing. The virtual camera position and attitude data is used for indicating the preview camera viewing angle of the to-be-generated animation image.

The animation image is rendered to obtain a rendering result.

The animation video of the virtual character is generated according to the rendering result and the voice recording data.

In another possible implementation, the real feature data of the real object is acquired in the manners below.

The action data of the real object is acquired. The action data includes limb action data and/or gesture action data.

The face data of the real object is acquired. The face data includes expression data and/or eye expression data.

In another possible implementation, the action data of the real object is acquired in the manners below.

The position data corresponding to each of multiple preset optical marker points on the limb of the real object is acquired. The limb action data of the real object is determined according to the position data corresponding to each of the multiple optical marker points.

The position data corresponding to each of multiple preset optical marker points on the hand of the real object is acquired. The gesture action data of the real object is determined according to the position data corresponding to each of the multiple optical marker points.

In another possible implementation, the face data of the real object is acquired in the manner below.

The face video frame of the real object is acquired. The face video frame is a video frame including the face of the real object. The face video frame is used for indicating the face data of the real object.

In another possible implementation, the target feature data of the virtual character is determined according to the real feature data in the manners below.

The real feature data is converted into the virtual feature data of the virtual object. The virtual object is a virtual model obtained by restoring and reconstructing the real object. The virtual feature data includes the action data and the face data of the virtual object.

The virtual feature data is redirected to obtain the target feature data of the virtual character.

In another possible implementation, the virtual feature data is redirected to obtain the target feature data of the virtual character in the manners below.

The action data of the virtual object is redirected to obtain the action data of the virtual character.

The action data includes limb action data and/or gesture action data.

The face data of the virtual object is redirected to obtain the face data of the virtual character. The face data includes expression data and/or eye expression data.

In another possible implementation, the action data of the virtual object is redirected to obtain the action data of the virtual character in the manners below.

A first correspondence between the skeleton data of the virtual object and the skeleton data of the virtual character is acquired. The skeleton data is used for indicating the topological structure feature of a skeleton.

The action data of the virtual object is redirected to the virtual character according to the first correspondence to obtain the action data of the virtual character.

In another possible implementation, the face data of the virtual object is redirected to obtain the face data of the virtual character in the manners below.

A second correspondence between the face data of the virtual object and the face data of the virtual character is acquired. The face data is used for indicating a facial structure feature and an emotional style feature.

The face data of the virtual object is redirected to the virtual character according to the second correspondence to obtain the face data of the virtual character.

In another possible implementation, after the target feature data of the virtual character is determined according to the real feature data, the method also includes the step below.

The skin motion of the virtual character is driven and displayed according to the action data of the virtual character and the binding relationship between the skeleton and skin of the virtual character.

In another possible implementation, before the animation of the virtual character is generated according to the target feature data, the method also includes the step below.

Video recording data carrying a time code is acquired. The video recording data includes video data obtained by recording the performance content of the real object.

In another possible implementation, the method also includes the steps below.

The prop motion data of a real prop used by the real object during the performance process is acquired.

The prop motion data of a virtual prop used by the virtual character is determined according to the real prop data.

The animation of the virtual character is generated according to the target feature data in the manner below.

The animation of the virtual character is generated according to the target feature data and the prop motion data.

According to another aspect of the present disclosure, an animation generation apparatus is provided. The apparatus includes an acquisition module, a determination module, and a generation module.

The acquisition module is configured to acquire the real feature data of the real object. The real feature data includes the action data and the face data of the real object during the performance process.

The determination module is configured to determine the target feature data of the virtual character according to the real feature data. The virtual character is the preset animation model. The target feature data includes the action data and the face data of the virtual character.

The generation module is configured to generate the animation of the virtual character according to the target feature data.

According to another aspect of the present disclosure, a computer device is provided. The computer device includes a processor and a memory configured to store processor-executable instructions.

The processor is configured to acquire the real feature data of the real object, where the real feature data includes the action data and the face data of the real object during the performance process; determine the target feature data of the virtual character according to the real feature data, where the virtual character is the preset animation model, and the target feature data includes the action data and the face data of the virtual character; and generate the animation of the virtual character according to the target feature data.

According to another aspect of the present disclosure, an animation generation system is provided. The animation generation system includes an action capture garment, a first camera, a helmet, and a computer device.

The action capture garment is provided with multiple optical marker points.

The first camera is configured to capture the action data of the real object during a performance.

The helmet is provided with a second camera. The second camera is configured to capture the face data of the real object during the performance.

The computer device is configured to execute the preceding method.

According to another aspect of the present disclosure, a non-transitory computer-readable storage medium is provided. The storage medium stores computer program instructions. When executing the computer program instructions, a processor performs the preceding method.

In the embodiments of the present disclosure, the real feature data of the real object is acquired. The real feature data includes the action data and the face data of the real object during the performance process. The target feature data of the virtual character is determined according to the real feature data. The virtual character is the preset animation model. The target feature data includes the action data and the face data of the virtual character. The animation of the virtual character is generated according to the target feature data. That is, the performance of the real object is used for generating the animation of the virtual character. In one aspect, a manual drawing condition is avoided, and the efficiency of animation generation is improved. In the other aspect, the delicate performance of the real object may be directly transferred to the virtual character, so that the skeleton action and facial emotion of the virtual character are more realistic and vivid, thereby ensuring the animation production effect.

BRIEF DESCRIPTION OF DRAWINGS

The drawings, which are included in and constitute a part of the specification, illustrate, together with the specification, example embodiments, features, and aspects of the present disclosure and are used to explain the principles of the present disclosure.

DETAILED DESCRIPTION

Figure 1:
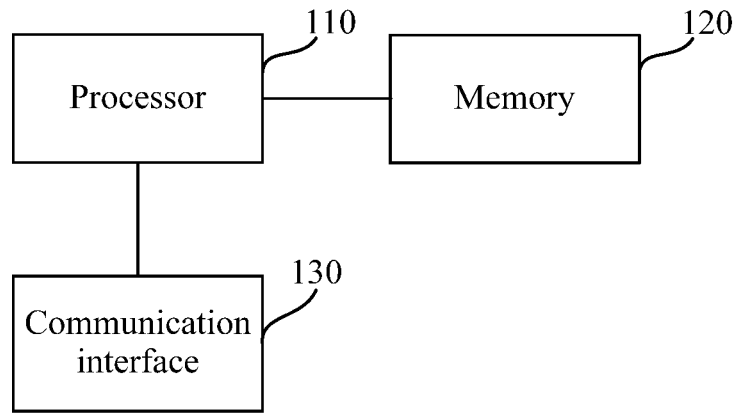
FIG. 1 shows a diagram illustrating the structure of a computer device according to example embodiments of the present disclosure.

Various example embodiments, features, and aspects of the present disclosure are described in detail below with reference to the drawings. Same reference numerals in the drawings indicate elements having same or similar functions. Although various aspects of the embodiments are shown in the drawings, the drawings are not necessarily drawn to scale unless otherwise indicated.

The exclusive word "example" as used herein means "serving as an example, an embodiment, or illustration." Any embodiment described herein as "example" is not necessarily to be construed as superior to or better than other embodiments.

In addition, to better illustrate the present disclosure, numerous specific details are set forth in the implementations below. It is to be understood by those skilled in the art that the present disclosure may be performed without certain specific details. In some embodiments, methods, means, elements, and circuits well known to those skilled in the art are not described in detail to highlight the spirit of the present disclosure.

Referring to FIG. 1, FIG. 1 shows a diagram illustrating the structure of a computer device according to example embodiments of the present disclosure.

The animation generation method in the embodiments of the present disclosure may be executed by the computer device.

The computer device may be a processing system including multiple devices or systems. For example, the computer device is a server, or a server cluster composed of several servers, or a cloud computing service center. This is not limited in the embodiments of the present disclosure. For ease of description, description is given by using an example in which a computer device is a server. As shown in FIG. 1, the computer device includes a processor 110, a memory 120, and a communication interface 130. It is to be understood by those skilled in the art that the structure shown in FIG. 1 does not limit the computer device, and the computer device may include more or fewer components than those illustrated, or may be configured by combining certain components or using different components.

The processor 110 is a control center of the computer device, connects various parts of the entire computer device by using various interfaces and lines, and executes the computer device's various functions and data processing by running or executing software programs and/or modules stored in the memory 120 and invoking data stored in the memory 120 to control the computer device integrally. The processor 110 may be implemented by a CPU or may be implemented by a graphics processing unit (GPU).

The memory 120 may be configured to store software programs and modules. The processor 110 runs the software programs and modules stored in the memory 120 to perform various function applications and data processing. The memory 120 may mainly include a program storage region and a data storage region. The program storage region may store an operating system, a virtual module, and an application program (such as neural network model training) required by at least one function. The data storage region may store data created according to the use of the computer device. The memory 120 may be implemented by any type of volatile or non-volatile storage device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Accordingly, the memory 120 may also include a memory controller to provide access to the memory 120 by the processor 110.

The processor 110 is configured to execute the following functions: acquiring real feature data of a real object, where the real feature data includes the action data and the face data of the real object during a performance process; determining the target feature data of a virtual character according to the real feature data, where the virtual character is a preset animation model, and the target feature data includes the action data and the face data of the virtual character; and generating the animation of the virtual character according to the target feature data.

The animation generation method provided in the embodiments of the present disclosure may be applied to the production of film and television previs[P1], the production of anime, game CG, a game animation, the production of a game action, and the production of a virtual animation short video, and is also the technical basis of virtual live streaming. For example, the animation generation method provided in the embodiments of the present disclosure is applied to the application field of the offline production of a performance animation of the virtual character, particularly the field of a three-dimensional animation. This is not limited in the embodiments of the present disclosure.

In the following, the animation generation method provided by the embodiments of the present disclosure is described using several example embodiments.

Figure 2:
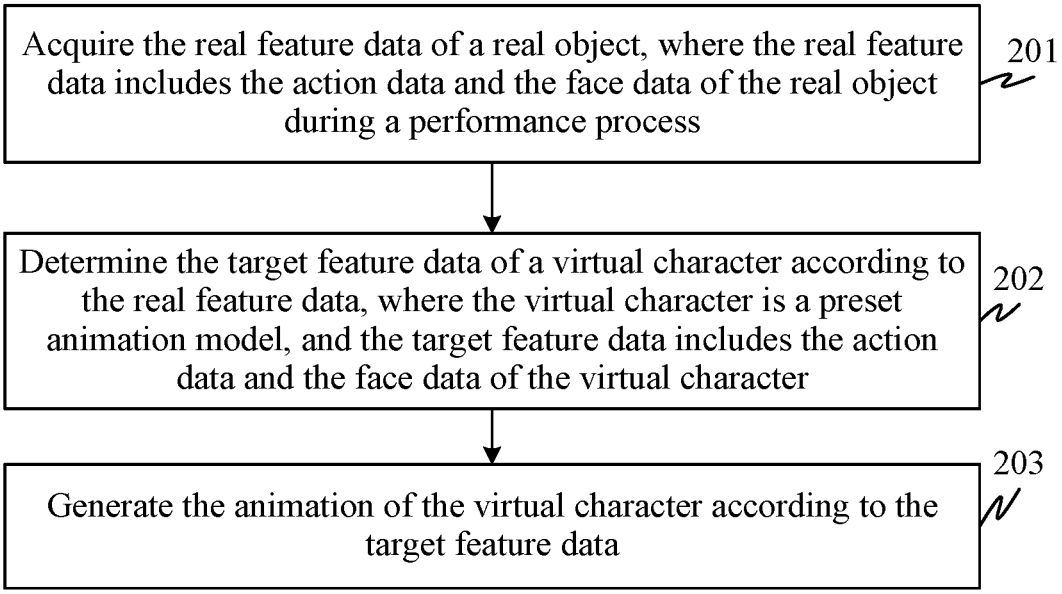
FIG. 2 shows a flowchart of an animation generation method according to example embodiments of the present disclosure.

Referring to FIG. 2, FIG. 2 shows a flowchart of an animation generation method according to example embodiments of the present disclosure. In the embodiments, description is given by using an example in which this method is used in the computer device shown in FIG. 1. The method includes the steps below.

In step 201, the real feature data of the real object is acquired. The real feature data includes the action data and the face data of the real object during the performance process.

During the performance process of the real object, the computer device captures the skeleton action of the real object through an optical capture device to obtain the action data of the real object. At the same time, the facial emotion of the real object is captured by the optical capture device to obtain the face data of the real object.

Optionally, the optical capture device includes at least one of an infrared camera, an RGB camera, or a depth camera. The type of the optical capture device is not limited in the embodiments of the present disclosure.

The real object is a movable object in a real environment. For example, the real object is a character. This is not limited in the embodiments of the present disclosure. The description below is given by using an example in which the real object is a character.

The real feature data includes the action data and the face data of the real object during the performance process. The action data is used for indicating the skeleton action of the real object. The face data is used for indicating the facial emotion of the real object.

The action data of the real object includes limb action data and/or gesture action data. The limb action data is used for indicating the limb action of the real object. The gesture action data is used for indicating the hand action of the real object.

It is to be noted that in the embodiments of the present disclosure, the limb refers to the part of the body other than the hand, that is, the body of the real object includes the limb of the real object and the hand other than the limb.

The face data of the real object includes expression data and/or eye expression data. The expression data is used for indicating the facial expression of the real object. The eye expression data is used for indicating the eyeball state of the real object.

In step 202, the target feature data of the virtual character is determined according to the real feature data. The virtual character is the preset animation model. The target feature data includes the action data and the face data of the virtual character.

The computer device converts the real feature data of the real object into the target feature data of the virtual character.

Optionally, the virtual character is a preset three-dimensional or two-dimensional animation model. The virtual character is a movable object in a virtual environment. Optionally, the virtual character is a virtual character, a virtual animal, a virtual pet, or other objects in a virtual form.

The target feature data of the virtual character includes the action data and the face data of the virtual character. The action data of the virtual character includes limb action data and/or gesture action data. The face data of the virtual character includes expression data and/or eye expression data.

The target feature data corresponds to the real feature data. The meaning of target feature data may be analogically referred to the related description of the real feature data, and the details are not repeated here.

It is to be noted that the computer device may acquire the face data of the real object in units of frames, and the subsequent face data of the virtual character determined according to the real feature data may also be correspondingly converted in units of frames. This is not limited in the embodiments of the present disclosure.

In step 203, the animation of the virtual character is generated according to the target feature data.

Optionally, the computer device generates the animation of the virtual character in real time or offline according to the target feature data of the virtual character.

The animation of the virtual character includes a three-dimensional or two-dimensional animation. In the following, for ease of description, description is given by using an example in which the animation of the virtual character is a three-dimensional animation.

Optionally, the computer device displays a target user interface. The target user interface includes the three-dimensional animation of the generated virtual character. The target user interface may also include the three-dimensional animation of the virtual character displayed in the virtual environment. The virtual environment is a three-dimensional virtual environment. The virtual environment is a scenario created for the virtual character to move. The virtual environment may be a simulation environment for the real world, may be a semi-simulation and semi-fiction environment, or may be a pure-fiction environment.

In an illustrative example, the real object is a character, for example, an actor. The actor performs the performances required by the character in a plot, including a limb action, a gesture action, an expression, and an eye expression according to a preset script and storyboard requirements and according to the guidance of a director. A corresponding capture device captures the actor's limb action, gesture action, expression, and eye expression. The computer device obtains the real feature data of the actor. The real feature data of the actor is converted into the target feature data of a virtual character. That is, the actor's limb action and gesture action are transferred to the virtual character, and the actor's expression and eye expression are transferred to the face of the virtual character. The three-dimensional animation of the virtual character is generated and displayed based on the target feature data.

In summary, the animation generation method provided in the embodiments of the present disclosure is an animation production method based on a performance. During the performance process of the real object, the real feature data of the real object, that is, the action data and face data of the real object, is acquired. The target feature data of the virtual character is determined according to the real feature data. The animation of the virtual character is generated according to the target feature data. That is, the performance of the real object is used for generating the animation of the virtual character. In one aspect, a manual drawing condition is avoided, and the efficiency of animation generation is improved. In the other aspect, the delicate performance of the real object may be directly transferred to the virtual character, so that the skeleton action and facial emotion of the virtual character are more realistic and vivid, thereby ensuring the animation production effect.

An embodiment of the present disclosure provides an animation generation system. The animation generation system includes an action capture garment, a first camera, and a helmet. The action capture garment is provided with multiple optical marker points. The first camera is configured to capture the action data of the real object during the performance. The helmet is provided with a second camera. The second camera is configured to capture the face data of the real object during the performance. The first camera and the second camera are communicatively connected to a computer device respectively. The computer device is configured to execute the animation generation method provided by the embodiments of the present disclosure. At least two first cameras are configured to capture the action data of the real object during the performance. Multiple first cameras may be disposed according to actual conditions. At least one second camera is configured to capture the face data of the real object during the performance. Multiple second cameras may be disposed according to actual conditions.

Figure 3:
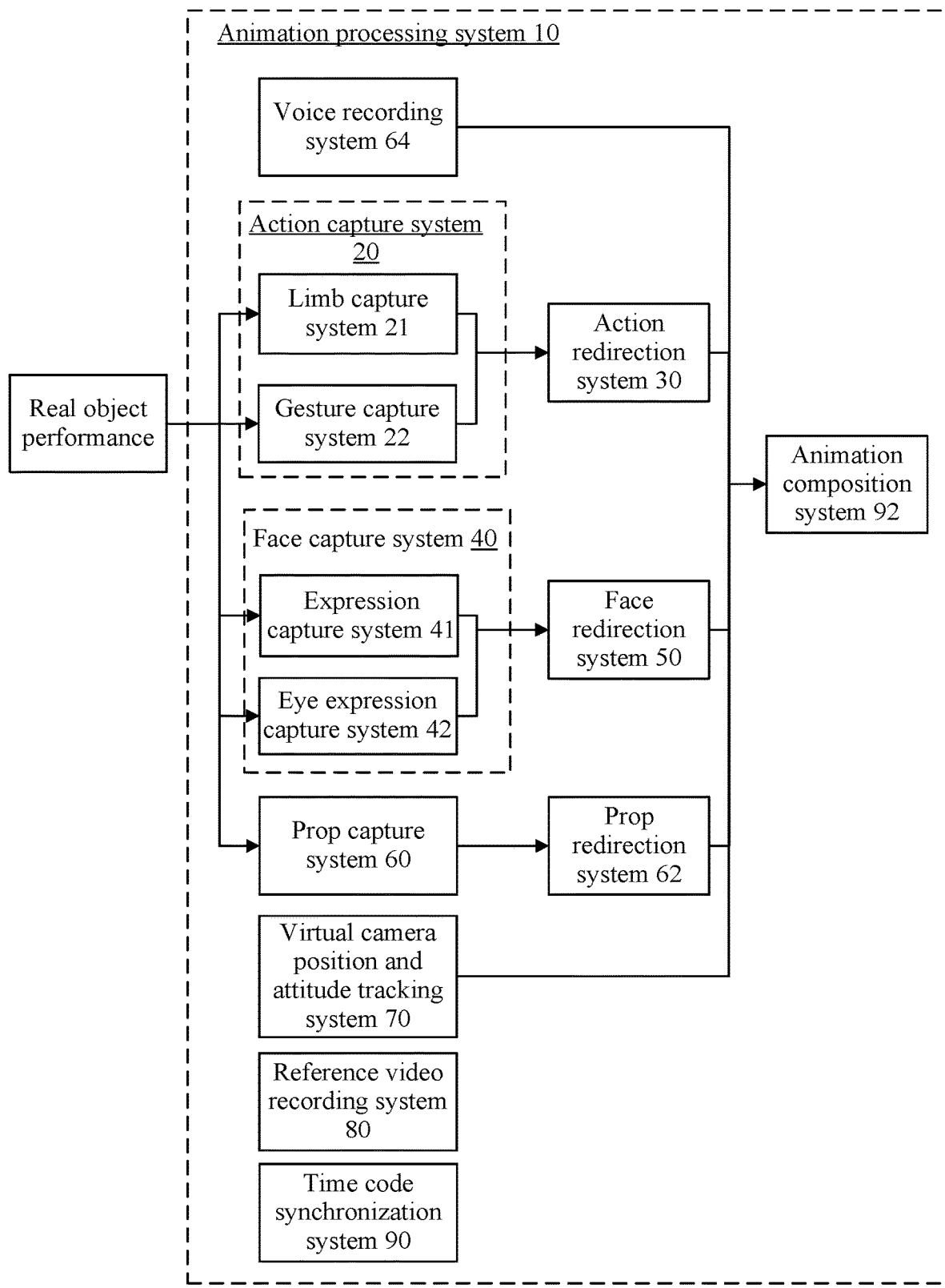
FIG. 3 shows a diagram illustrating the structure of a computer device according to example embodiments of the present disclosure.

Referring to FIG. 3, FIG. 3 shows a diagram illustrating the structure of a computer device according to example embodiments of the present disclosure.

The computer device 10 includes an action capture system 20, an action redirection system 30, a face capture system 40, a face redirection system 50, a prop capture system 60, a prop redirection system 62, a voice recording system 64, a virtual camera position and attitude [P2] tracking system 70, a reference video recording system 80, and an animation composition system 92.

The action capture system 20 includes a limb capture system 21 and a gesture capture system 22. The limb capture system 21 and the gesture capture system 22 are connected to the action redirection system 30 respectively.

The limb capture system 21 is configured to acquire the position data corresponding to each of multiple preset optical marker points on the limb of the real object. The limb action data of the real object is determined according to the position data corresponding to each of the multiple optical marker points. Limb reconstruction is performed according to the limb action data of the real object, and the limb action data of a virtual object is obtained.

The virtual object is a virtual model obtained by restoring and reconstructing the real object.

The gesture capture system 22 is configured to acquire the position data corresponding to each of multiple preset optical marker points on the hand of the real object. The gesture action data of the real object is determined according to the position data corresponding to each of the multiple optical marker points. Hand reconstruction is performed according to the gesture action data of the real object, and the gesture action data of the virtual object is obtained.

Optionally, the limb capture system 21 is used for limb capture by the first camera. At the same time, the gesture capture system 22 is used for gesture capture by the first camera. For example, the first camera is an infrared camera.

The action redirection system 30 is configured to redirect the action data of the virtual object to obtain the action data of the virtual character. The action data includes limb action data and/or gesture action data.

The face capture system 40 includes an expression capture system 41 and an eye expression capture system 42. The expression capture system 41 and the eye expression capture system 42 are connected to the face redirection system 50 respectively.

The expression capture system 41 is configured to acquire the face video frame of the real object. The face video frame is a video frame including the face of the real object. The face video frame is used for indicating the face data of the real object. Face reconstruction is performed according to the face data of the real object, and the face data of the virtual object is obtained.

Optionally, the expression capture system 41 is configured to acquire the face video frame of the real object by the second camera on the helmet of the real object. For example, the second camera is a head-mounted RGB camera or an RGBD camera.

The face redirection system 50 is configured to redirect the face data of the virtual object, and the face data of the virtual character is obtained. In this embodiment of the present disclosure, the redirection processing in the face redirection process is also referred to as expression transfer processing.

It is to be noted that in this embodiment of the present disclosure, the action data includes limb action data and/or gesture action data. The face data includes expression data and/or eye expression data. That is, the action data of the real object includes the limb action data and/or gesture action data of the real object. The face data of the real object includes the expression data and/or eye expression data of the real object. The action data of the virtual object includes the limb action data and/or gesture action data of the virtual object. The face data of the virtual object includes the expression data and/or eye expression data of the virtual object. The action data of the virtual character includes the limb action data and/or gesture action data of the virtual character. The face data of the virtual character includes the expression data and/or eye expression data of the virtual character. The action redirection system 30, the face redirection system 50, the prop redirection system 62, the voice recording system 64, and the virtual camera position and attitude tracking system 70 are connected to the animation composition system 92 respectively.

The action redirection system 30 is also configured to input the action data of the virtual character obtained after the redirection into the animation composition system 92.

The face redirection system 50 is also configured to input the face data of the virtual character obtained after the redirection into the animation composition system 92.

The prop capture system 60 is connected to the prop redirection system 62. The prop capture system 60 is configured to acquire the prop motion data of the real prop used by the real object during the performance.

During the performance of the real object, the prop capture system 60 is configured to capture the action of the used real prop to obtain the prop motion data of the real prop. The prop motion data of the real prop is used for indicating the action of the real prop. The real prop may be a football, a basketball, a knife, a sword, and a stair. The type of the real prop is not limited in the embodiments of the present disclosure.

Optionally, the prop capture system 60 is used for prop capture by the first camera. For example, the first camera is an infrared camera.

Optionally, the prop capture system 60 is configured to acquire the position data corresponding to an optical marker point preset on the real prop. The prop motion data of the real prop is determined according to the position data corresponding to the optical marker point. Prop reconstruction is performed according to the prop motion data of the real prop, and the prop motion data of a virtual intermediate prop is obtained.

The virtual intermediate prop is a virtual model obtained by restoring and reconstructing the real prop.

The prop redirection system 62 is configured to redirect the prop motion data of the virtual intermediate prop to obtain the prop motion data of the virtual prop used by the virtual character. The prop motion data of the virtual prop is used for indicating the action of the virtual prop.

The prop redirection system 62 is also configured to input the redirected prop motion data of the virtual prop into the animation composition system 92.

The voice recording system 64 is configured to record the voice of the real object during the performance to obtain voice recording data and input the voice recording data into the animation composition system 92.

The virtual camera position and attitude tracking system 70 is configured to capture a virtual camera to obtain virtual camera position and attitude data and input the virtual camera position and attitude data into the animation composition system 92. The virtual camera position and attitude data is used for indicating the preview camera viewing angle of a to-be-generated animation image. The virtual camera position and attitude data includes a virtual camera position, a virtual camera direction, and a virtual camera parameter. For example, the virtual camera parameter includes a focal length.

The reference video recording system 80 is configured to shoot the performance content of the real object to obtain video recording data. The video recording data may be used as the reference data for the post-production of the to-be-generated animation. That is, the video recording data is the reference data of the animation composition system 92.

Optionally, in this embodiment of the present disclosure, limb capture, gesture capture, expression capture, eye expression capture, voice recording, reference video recording, and prop capture are performed simultaneously. However, since the limb capture, gesture capture, expression capture, eye expression capture, voice recording, reference video recording, and prop capture are completed by different systems, and due to communication delays, different signals may be out of sync, and a finally generated animation needs to ensure that the various preceding systems are fully synchronized. Thus, a time code synchronization system 90 is added to the entire computer device 10, and the various systems in the computer device 10 are synchronized based on the same time code.

The rendering engine 92 is configured to synchronize multiple imported data (including limb action data, gesture action data, expression data, eye expression data, voice recording data, virtual camera position and attitude data, and prop motion data of the virtual prop) according to a time code. After synchronization, the multiple imported data are synthesized and rendered to obtain an animation video, and the generated animation video is displayed.

A point to be noted is that the implementation details of the steps involved in each of the preceding systems may be referred to the related description in the following embodiments, which are not described herein.

Another point to be noted is that when the system provided in the preceding embodiment implements the functions of the system, only the division of the various preceding systems is used as an example for illustration. In practical applications, the preceding functions may be allocated to different systems for completion according to actual requirements to perform all or part of the functions described above. For example, a limb action capture system and a gesture action capture system may be combined into one system, that is, the action capture system, and the expression capture system and the eye expression capture system may be combined into one system, that is, the face capture system. The action capture system and the action redirection system may be combined into one system, that is, an action processing system. The face capture system and the face redirection system may be combined into one system, that is, an emotion processing system. The prop capture system and the prop redirection system may be combined into one system, that is, a prop processing system. All the preceding systems may also be combined into one system. This is not limited in this embodiment.

Figure 4:
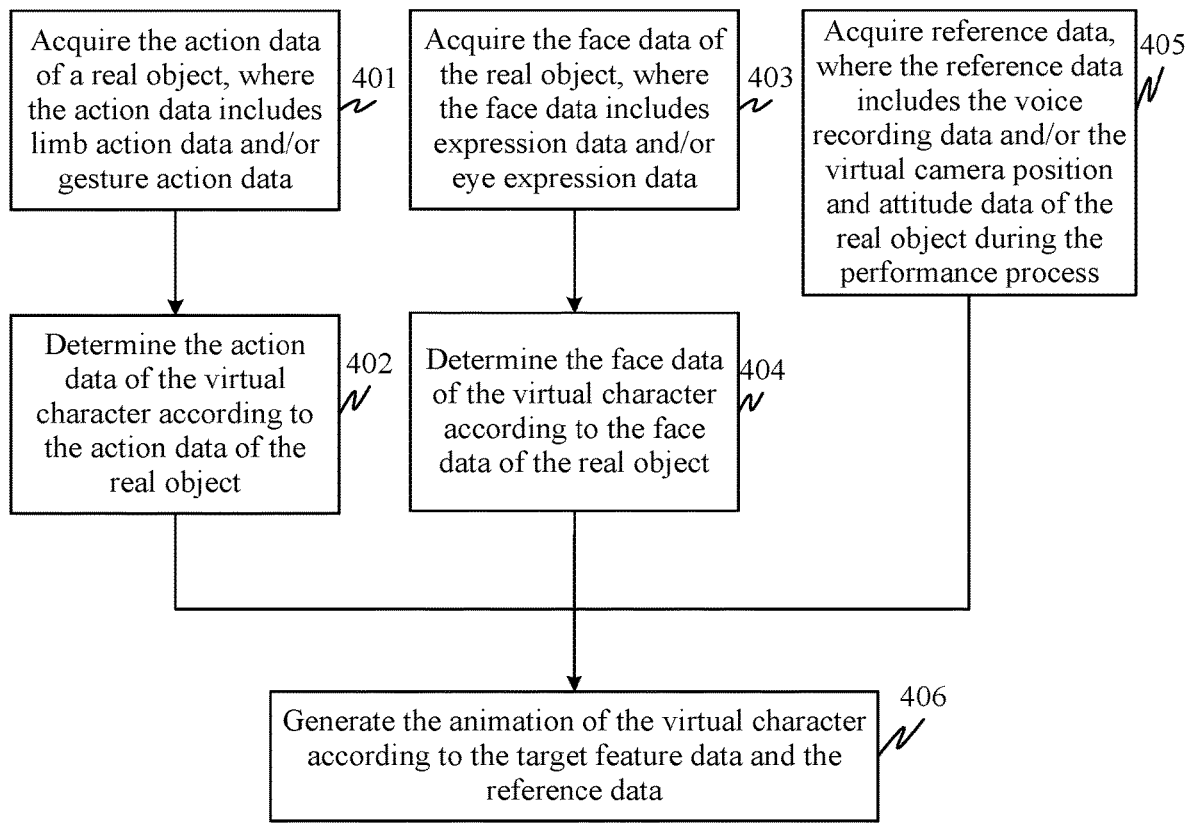
FIG. 4 shows a flowchart of an animation generation method according to example embodiments of the present disclosure.

Referring to FIG. 4, FIG. 4 shows a flowchart of an animation generation method according to example embodiments of the present disclosure. In the embodiments, description is given by using an example in which this method is used in the computer device shown in FIG. 3. The method includes the steps below. The method includes the steps described below.

In step 401, the action data of the real object is acquired. The action data includes limb action data and/or gesture action data.

During the performance process of the real object, the action capture system acquires the action data of the real object. The action data includes limb action data and/or gesture action data.

For example, the real object is a character (for example, an actor). Action capture is the recording of the action data of the actor. Action capture is acquired by a device worn or affixed to the actor. For example, the actor wears a suit of clothes with a camera tracking marker or a built-in sensor and performs an action capture process by the light reflection of the camera tracking marker or the movement of the sensor.

In a possible implementation, the position data corresponding to each of multiple preset optical marker points on the limb of the real object is acquired. The limb action data of the real object is determined according to the position data corresponding to each of the multiple optical marker points. Moreover/Alternatively, the position data corresponding to each of multiple preset optical marker points on the hand of the real object is acquired. The gesture action data of the real object is determined according to the position data corresponding to each of the multiple optical marker points.

Optionally, the real object wears a suit of action capture garment provided with multiple optical marker points, and the action capture garment covers the limb and hand of the real object. For example, the action capture garment includes a garment covering the limb of the real object and a glove covering the hand of the real object.

Optionally, there is a one-to-one correspondence between the multiple preset optical marker points on the garment of the real object and multiple articulation points of the limb of the real object. There is a one-to-one correspondence between the multiple preset optical marker points on the glove of the real object and multiple articulation points of the hand of the real object.

The action capture system acquires the action data of the real object by a first optical capture device. For example, the first optical capture device is an infrared camera. The action capture system captures multiple light reflection point (including at least one optical marker point) positions on the real object by the infrared camera, calculates the figure of the real object in real time, and tracks the action of the real object. That is, the action capture system determines the figure of the real object and the action data of the real object according to the multiple light reflection point positions. The action data includes limb action data and/or gesture action data.

Optionally, the limb action data is used for indicating the limb action of the real object. The limb action data includes the three-dimensional position coordinate and action parameter of each of the articulation points on the limb of the real object. For example, an articulation point is a key articulation point at a preset position, such as a head, neck, shoulder, arm, and leg.

The gesture action data is used for indicating the hand action of the real object. The gesture action data includes the three-dimensional position coordinate and action parameter of each of the articulation points on the hand of the real object.

In step 402, the action data of the virtual character is determined according to the action data of the real object.

The action capture system converts the action data of the real object into the action data of the virtual object. The action redirection system redirects the action data of the virtual object to obtain the action data of the virtual character.

The virtual object is the virtual model obtained by restoring and reconstructing the real object. Optionally, the virtual object is a virtual model obtained by one-to-one restoration and reconstruction of the real object.

Optionally, the virtual object is a three-dimensional or two-dimensional virtual model. In the following, description is given by using an example in which the virtual object is a three-dimensional virtual model. There is a mapping relationship between the action data of the virtual object and the action data of the real object. The meaning of the action data of the virtual object may be analogically referred to the related description of the action data of the real object, and the details are not repeated here.

In a possible implementation, the action redirection system redirects the action data of the virtual object to obtain the action data of the virtual character in the following manners: A first correspondence between the skeleton data of the virtual object and the skeleton data of the virtual character is acquired, where the skeleton data is used for indicating the topological structure feature of a skeleton; and the action data of the virtual object is redirected to the virtual character according to the first correspondence to obtain the action data of the virtual character.

Before the action data of the virtual object is redirected to obtain the action data of the virtual character, the first correspondence between the skeleton data of the virtual object and the skeleton data of the virtual character is established. The skeleton data of the virtual object is used for indicating the topological structure feature of the skeleton of the virtual object. The skeleton data of the virtual character is used for indicating the topological structure feature of the skeleton of the virtual character.

The topological structure feature of the skeleton is used for indicating the distribution of skeletons and the connection state between skeletons.

The action redirection system redirects the action data of the virtual object to the virtual character according to the first correspondence to obtain the action data of the virtual character in the following manners: The limb action data of the virtual object is redirected to the virtual character according to the first correspondence to obtain the limb action data of the virtual character; and/or the gesture action data of the virtual object is redirected to the virtual character to obtain the gesture action data of the virtual character.

Optionally, after the action data of the virtual character is determined according to the action data of the real object, the skin motion of the virtual character is driven and displayed according to the action data of the virtual character and the binding relationship between the skeleton and skin of the virtual character. The binding relationship between the skeleton and skin of the virtual character is preset.

In step 403, the face data of the real object is acquired. The face data includes expression data and/or eye expression data.

In a possible implementation, the face video frame of the real object is acquired. The face video frame is the video frame including the face of the real object. The face video frame is used for indicating the face data of the real object.

Optionally, the face capture system acquires the face video frame of the real object by a second optical capture device.

Optionally, the expression data of the real object is used for indicating the facial expression of the real object. The expression data includes the three-dimensional position coordinate and action parameter of each feature point on the face of the real object. Each feature point is the contour on the face of the real object and each feature point on the facial feature of the real object.

Optionally, the eye expression data of the real object is used for indicating the eyeball state of the real object. The eye expression data includes the three-dimensional position coordinate and action parameter of each feature point on the eyeball of the real object. The data structure of the expression data and the data structure of the eye expression data are not limited in this embodiment.

In step 404, the face data of the virtual character is determined according to the face data of the real object.

The face capture system converts the face data of the real object into the face data of the virtual object. The face redirection system redirects the face data of the virtual object to obtain the face data of the virtual character. The virtual object is the virtual model obtained by restoring and reconstructing the real object.

The face data of the virtual object includes the expression data and/or eye expression data of the virtual character. There is a mapping relationship between the face data of the virtual object and the face data of the real object. The meaning of the face data of the virtual object may be analogically referred to the related description of the face data of the real object, and the details are not repeated here.

Optionally, the face capture system converts the face data of the real object into the face data of the virtual object in the following manner: The face capture system invokes a first preset face processing model to output the face model of the virtual object according to the face data of the real object. The face model is used for indicating the face data of the virtual object.

Optionally, the face video frame of the real object is the video frame including the face of the real object. The face video frame is data in a two-dimensional form. The face model of the virtual object is used for indicating the expression data and/or eye expression data of the virtual character. The face model is data in a three-dimensional form. The first preset face processing model is configured to convert the two-dimensional face video frame of the real object into the three-dimensional face model of the virtual object.

Optionally, the first preset face processing model is a pre-trained neural network model configured to represent the correlation between the face video frame of the real object and the face model of the virtual object.

Optionally, the first preset face processing model is a preset mathematical model. The first preset face processing model includes the model coefficient between the face video frame of the real object and the face model of the virtual object. The model coefficient may be a fixed value or a dynamically modified value.

Optionally, the face redirection system redirects the face data of the virtual object to obtain the face data of the virtual character in the following manners: A second correspondence between the face data of the virtual object and the face data of the virtual character is acquired, where the face data is used for indicating a facial structure feature and an emotional style feature; and the face data of the virtual object is redirected to the virtual character according to the second correspondence to obtain the face data of the virtual character.

Before the face data of the virtual object is redirected to obtain the face data of the virtual character, the second correspondence between the face data of the virtual object and the face data of the virtual character is established. The face data of the virtual object is used for indicating the facial structure feature and the emotional style feature of the virtual object. The face data of the virtual character is used for indicating the facial structure feature and the emotional style feature of the virtual character.

The facial structural feature is used for indicating the contour of the face and the distribution of the facial feature. The emotional style feature is used for indicating emotions reflected by multiple feature points on the face, such as happiness, sadness, and helplessness.

Optionally, the face redirection system redirects the face data of the virtual object to the virtual character according to the second correspondence to obtain the face data of the virtual character in the following manners: The expression data of the virtual object is redirected to the virtual character according to the second correspondence to obtain the expression data of the virtual character; and/or the eye expression data of the virtual object is redirected to the virtual character to obtain the eye expression data of the virtual character.

Optionally, the face redirection system redirects the face data of the virtual object to obtain the face data of the virtual character in the following manners: The face redirection system invokes a second preset face processing model to output the face data of the virtual character according to the face data of the virtual object.

Optionally, the second preset face processing model is a pre-trained neural network model configured to represent the correlation between the face data of the virtual object and the face data of the virtual character.

Optionally, the second preset face processing model is a preset mathematical model. The second preset face processing model includes the model coefficient between the face data of the virtual object and the face data of the virtual character. The model coefficient may be a fixed value or a dynamically modified value.

It is to be noted that the redirection processing in the face redirection process is also referred to as expression transfer processing. The specific implementation of the expression transfer processing is not limited in this embodiment of the present disclosure. For example, the real object is a character (for example, an actor), and the second optical capture device is a head-mounted RGB camera. The face capture system captures the expression and the eye expression of the actor during a performance process by the head-mounted RGB camera worn by the actor to obtain a video. The video includes multiple face video frames. For each face video frame, the three-dimensional face model of the virtual object is reconstructed, and the three-dimensional face model of the virtual object is redirected to obtain the face data of the virtual character.

The methods below may be used to capture the expression and eye expression of the actor during the performance process. A method for drawing a point on a face refers to marking several marker points on the actor's face to capture the face and obtain face information. A method for not drawing a point on a face means that there is no marker point on the actor's face, and an algorithm is used to directly extract information from the actor's face to capture the face and obtain face information. In a face capture process, a single camera or multiple cameras may be used to capture a face. A single camera is portable and easy to wear, and the result of multiple cameras can be implemented. Multiple cameras can capture face data from multiple angles. A capture device may use an RGB camera and/or an RGBD camera.

In step 405, reference data is acquired. The reference data includes the voice recording data and/or the virtual camera position and attitude data of the real object during the performance process.

During the performance process of the real object, the action data and the face data of the real object are captured, and at the same time, the voice recording system records the voice of the real object to obtain the voice recording data of the real object, and the virtual camera position and attitude tracking system captures a virtual camera to obtain virtual camera position and attitude data.

That is, during the performance process of the real object, a virtual camera is synchronously captured, and the position and attitude and movement track of the virtual camera are recorded to obtain virtual camera position and attitude data. The virtual camera position and attitude data is used for indicating the preview camera viewing angle of a to-be-generated animation image. The preview camera viewing angle is an angle at which the virtual character and/or other scenario information are observed by the virtual camera in the virtual environment. That is, the to-be-generated animation image is an animation image acquired by observing the virtual character from the viewing angle of the virtual camera. The virtual camera position and attitude data includes a virtual camera position, a virtual camera direction, and a virtual camera parameter. For example, the virtual camera parameter includes a focal length.

It is to be noted that the capture and redirection process of the action data shown in step 401 and step 402, the capture and redirection process of the face data shown in step 403 and step 404, and the acquisition process of the reference data shown in step 405 may be executed in parallel, regardless of order.

In step 406, the animation of the virtual character is generated according to the target feature data and the reference data.

The animation composition system generates the animation of the virtual character in real time or offline according to the target feature data and the reference data. Optionally, the animation of the virtual character includes a three-dimensional or two-dimensional animation.

After the voice recording system records and obtains the voice recording data of the real object and records the voice recording data into the animation composition system. The animation composition system determines the voice data of the virtual character according to the recorded voice recording data.

Optionally, the voice recording data of the real object is the voice data of the virtual character, or preset voice processing is performed on the voice recording data of the real object to obtain the voice data of the virtual character, or the voice recording data is replaced by dubbing data to obtain the voice data of the virtual character. This is not limited in the embodiments of the present disclosure.

After the virtual camera position and attitude tracking system captures and obtains the virtual camera position and attitude data, the virtual camera position and attitude data is recorded into the animation composition system. The animation composition system determines the preview camera viewing angle of the to-be-generated animation according to the recorded virtual camera position and attitude data.

Optionally, the target feature data carries a time code, and the reference data carries a time code. The animation composition system generates the animation of the virtual character according to the target feature data and the reference data in the following manners: The target feature data and the reference data are aligned according to the time code corresponding to the target feature data and the time code corresponding to the reference data; and the animation of the virtual character is generated according to the aligned target feature data and the aligned reference data.

The aligned target feature data and the aligned reference data are time-synchronized data.

For example, the action data, the face data, the voice recording data, and the virtual camera position and attitude data all carry a time code. The animation composition system aligns the imported action data, face data, voice recording data, and virtual camera position and attitude data according to a time code, and then performs synthesis and rendering to obtain an animation video after alignment processing.

Optionally, the animation composition system generates the animation of the virtual character according to the aligned target feature data and the aligned reference data in the following manners: An animation image is obtained according to the virtual camera position and attitude data and the target feature data after alignment processing; the virtual camera position and attitude data is used for indicating the preview camera viewing angle of the to-be-generated animation image; the animation image is rendered to obtain a rendering result; and the animation video of the virtual character is generated according to the rendering result and the voice recording data. The virtual camera position and attitude data includes a virtual camera position, a virtual camera direction, and a virtual camera parameter. For example, the virtual camera parameter includes a focal length.

Optionally, the animation composition system acquires video recording data carrying a time code. The video recording data includes video data obtained by recording the performance content of the real object. The video recording data may be used as the reference data of the to-be-generated animation.

After the animation composition system generates the animation of the virtual character, the animation of the virtual character is displayed. It is to be noted that the relevant details about displaying the animation of the virtual character on a display screen may be referred to the relevant description in the preceding embodiment, and the details are not repeated here.

In an illustrative example, the real object is an actor, the virtual object is a virtual actor model, and the virtual character is a preset virtual animation character. The action capture system captures multiple light reflection point positions on the actor by an infrared camera. The action data of the actor is reconstructed as the action data of the virtual actor model according to multiple light reflection point positions. The action redirection system redirects the action data of the virtual actor model to obtain the action data of the virtual animation character. The face capture system acquires the face video frame of the actor by a head-mounted RGB camera or an RGBD camera worn by the actor. The face video frame of the actor is converted into the face data of the virtual actor model. The face redirection system redirects the face data of the virtual actor model to obtain the action data of the virtual animation character. The voice recording system captures the skeletal action and the facial emotion of the actor, and at the same time, the voice recording system records the voice of the actor to obtain the voice recording data. The virtual camera position and attitude tracking system records the position and attitude and the movement track of the virtual camera to obtain the virtual camera position and attitude data. The various preceding systems are synchronized based on the same time code. The animation composition system acquires multiple imported data. The multiple data includes action data (limb action data and gesture action data), face data (expression data and eye expression data), voice recording data, and virtual camera position and attitude data. The animation composition system synchronizes the multiple imported data according to a time code, generates an animation according to the multiple imported data after synchronization, and displays the generated animation.

Optionally, the method also includes acquiring the prop motion data of the real prop used by the real object during the performance process; and determining the prop motion data of the virtual prop used by the virtual character according to the real prop data; and generating the animation of the virtual character according to the target feature data and the prop motion data of the virtual prop.

During the performance process of the real object, the prop capture system acquires the prop motion data of the real prop used by the real object. The prop capture system converts the prop motion data of the real prop into the prop motion data of the virtual intermediate prop. The prop redirection system redirects the prop motion data of the virtual intermediate prop, and the prop motion data of the virtual prop is obtained.

In an illustrative example, the real prop is a football. The actor plays football. The football may move, such as moving and rotating. The prop capture system captures the movement of the football to obtain the prop motion data of the football. Prop reconstruction is performed according to the prop motion data of the football to obtain the prop motion data of a virtual intermediate football. The prop redirection system redirects the prop motion data of the virtual intermediate football to obtain the prop motion data of the virtual intermediate football.

In another illustrative example, the real prop is a sword. The actor waves the sword. The sword may move. The prop capture system captures the movement of the sword to obtain the prop motion data of the sword. Prop reconstruction is performed according to the prop motion data of the sword to obtain the prop motion data of a virtual intermediate sword. The prop redirection system redirects the prop motion data of the virtual intermediate sword to obtain the prop motion data of the virtual intermediate sword.

A point to be noted is that the method in which the prop capture system performs prop capture may be analogically referred to the method in which the action capture system performs action capture. The method in which the prop redirection system performs redirection processing may be analogically referred to the method in which the action redirection system performs redirection processing, and the details are not repeated here.

Another point to be noted is that the capture and redirection process of the action data, the capture and redirection process of the face data, the acquisition process of the reference data, and the capture and redirection process of the prop motion data may be executed in parallel, regardless of order.

Optionally, the prop motion data of the virtual prop also carries a time code. The animation composition system aligns the target feature data, the reference data, and the prop motion data according to the time code corresponding to the target feature data, the time code corresponding to the reference data, and the time code corresponding to the prop motion data respectively. The animation of the virtual character is generated according to the aligned target feature data, the aligned reference data, and the aligned prop motion data.

Optionally, the animation composition system obtains an animation image according to the virtual camera position and attitude data, the target feature data, and the prop motion data after alignment processing. The animation image is rendered to obtain a rendering result. The animation video of the virtual character is generated according to the rendering result and the voice recording data.

It is to be noted that the method in which the animation composition system generates the animation of the virtual character according to the aligned target feature data, the aligned reference data, and aligned the prop motion data may be analogically referred to the method in which the animation of the virtual character is generated according to the aligned target feature data and the aligned reference data, and the details are not repeated here.

In summary, in this embodiment of the present disclosure, the real feature data is converted into the virtual feature data of the virtual object. The virtual object is the virtual model obtained by restoring and reconstructing the real object. The virtual feature data includes the action data and the face data of the virtual object. The action data includes limb action data and/or gesture action data. The face data includes expression data and/or eye expression data. The details of the skeleton action and the facial emotion of the virtual character can be more accurately reflected, so that the generated virtual character is more vivid and natural, and the animation effect of the virtual character is ensured.

In this embodiment of the present disclosure, the reference data is acquired. The reference data includes the voice recording data and/or the virtual camera position and attitude data of the real object during the performance process. The animation of the virtual character is generated in real time according to the target feature data and the reference data. That is, the "what you see is what you get" method of virtual shooting is adopted. In this manner, the performance of the real object can be seen in real time on the spot, and the performance can be confirmed on the spot. Thus, the shooting efficiency is improved.

In this embodiment of the present disclosure, the target feature data carries a time code, and the reference data carries a time code. The target feature data and the reference data are aligned according to the time code corresponding to the target feature data and the time code corresponding to the reference data. The animation of the virtual character is generated according to the aligned target feature data and the aligned reference data. The skeletal action, facial emotion, voice, and virtual camera position and attitude of the virtual character are synchronized. In this manner, the display details of the animation of the virtual character are enriched, and at the same time, the natural smoothness of the animation is ensured. Further, the display effect of the animation is ensured.

The animation generation method may be applied to the field of a performance animation. The preceding animation generation method may implement the capture of a single person or the capture of multiple persons, that is, the output of a single virtual character may be implemented in the same image, and the output of multiple virtual characters may be implemented. In the case of multi-person capture, interactions between actors may be captured, such as a hug and a handshake. The interaction of the virtual character is output according to the interactions between multiple actors.

The animation generation method supports an offline mode and a real-time online mode. In the offline mode, a data processing tool in the animation processing system 10 may be used to process animation data offline and adjust the animation data. An animation refinement tool in the animation processing system 10 may be used to refine the animation data. In this manner, animators are allowed to improve the animation quality and control the animation style. Offline processing and animation refinement may be performed on the body and the face. Furthermore, offline animation production may be applied to, for example, a character animation in a film and television animation, a game animation, a virtual short video, or a character animation in a variety show. In the real-time mode, the animation generation method may be used for a real-time animation, supporting real-time live streaming, and the real-time interaction of the virtual character, for example, interactions between virtual characters.

The following is the device embodiment of the embodiments of the present disclosure. For portions not described in detail in the device embodiment, reference may be made to the technical details disclosed in the preceding method embodiments.

Figure 5:
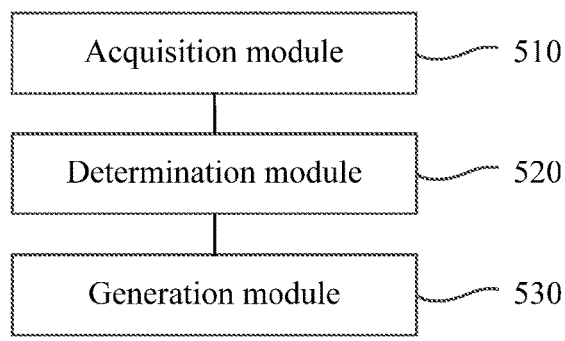
FIG. 5 shows a diagram illustrating the structure of an animation generation apparatus according to example embodiments of the present disclosure.

Referring to FIG. 5, FIG. 5 shows a diagram illustrating the structure of an animation generation apparatus according to example embodiments of the present disclosure. The animation generation apparatus may be implemented as all or part of a user device by software, hardware, and a combination of the two. The apparatus includes an acquisition module 510, a determination module 520, and a generation module 530.

The acquisition module 510 is configured to acquire the real feature data of the real object. The real feature data includes the action data and the face data of the real object during the performance process.

The determination module 520 is configured to determine the target feature data of the virtual character according to the real feature data. The virtual character is the preset animation model. The target feature data includes the action data and the face data of the virtual character.

The generation module 530 is configured to generate the animation of the virtual character according to the target feature data.

In a possible implementation, the acquisition module 510 is configured to acquire the reference data. The reference data includes the voice recording data and/or the virtual camera position and attitude data of the real object during the performance process.

The generation module 530 is configured to generate the animation of the virtual character according to the target feature data and the reference data.

In another possible implementation, the target feature data carries a time code, and the reference data carries a time code. The generation module 530 is also configured to align the target feature data and the reference data according to the time code corresponding to the target feature data and the time code corresponding to the reference data; and generate the animation of the virtual character according to the aligned target feature data and the aligned reference data.

In another possible implementation, the generation module 530 is also configured to obtain the animation image according to the virtual camera position and attitude data and the target feature data after alignment processing, where the virtual camera position and attitude data is used for indicating the preview camera viewing angle of the to-be-generated animation image; render the animation image to obtain the rendering result; and generate the animation video of the virtual character according to the rendering result and the voice recording data.

In another possible implementation, the acquisition module 510 is also configured to acquire the action data of the real object, where the action data includes limb action data and/or gesture action data; and acquire the face data of the real object, where the face data includes expression data and/or eye expression data.

In another possible implementation, the acquisition module 510 is also configured to acquire the position data corresponding to each of multiple preset optical marker points on the limb of the real object and determine the limb action data of the real object according to the position data corresponding to each of the multiple optical marker points; and/or acquire the position data corresponding to each of multiple preset optical marker points on the hand of the real object and determine the gesture action data of the real object according to the position data corresponding to each of the multiple optical marker points.

In another possible implementation, the acquisition module 510 is also configured to acquire the face video frame of the real object. The face video frame is the video frame including the face of the real object. The face video frame is used for indicating the face data of the real object.

In another possible implementation, the determination module 520 is also configured to convert the real feature data into the virtual feature data of the virtual object, where the virtual object is the virtual model obtained by restoring and reconstructing the real object, and the virtual feature data includes the action data and the face data of the virtual object; and redirect the virtual feature data to obtain the target feature data of the virtual character.

In another possible implementation, the determination module 520 is also configured to redirect the action data of the virtual object to obtain the action data of the virtual character, where the action data includes limb action data and/or gesture action data; and redirect the face data of the virtual object to obtain the face data of the virtual character, where the face data includes expression data and/or eye expression data.

In another possible implementation, the determination module 520 is also configured to acquire the first correspondence between the skeleton data of the virtual object and the skeleton data of the virtual character, where the skeleton data is used for indicating the topological structure feature of a skeleton; and redirect the action data of the virtual object to the virtual character according to the first correspondence to obtain the action data of the virtual character.

In another possible implementation, the determination module 520 is also configured to acquire the second correspondence between the face data of the virtual object and the face data of the virtual character, where the face data is used for indicating the facial structure feature and the emotional style feature; and redirect the face data of the virtual object to the virtual character according to the second correspondence to obtain the face data of the virtual character.

In another possible implementation, the apparatus also includes a display module.

The display module is configured to drive and display the skin motion of the virtual character according to the action data of the virtual character and the binding relationship between the skeleton and skin of the virtual character.

In another possible implementation, the apparatus also includes a recording module.

The recording module is configured to acquire the video recording data carrying a time code. The video recording data includes video data obtained by recording the performance content of the real object.

In another possible implementation, the acquisition module 510 is also configured to acquire the prop motion data of the real prop used by the real object during the performance process.

The determination module 520 is also configured to determine the prop motion data of the virtual prop used by the virtual character according to the real prop data.

The generation module 530 is also configured to generate the animation of the virtual character according to the target feature data and the prop motion data of the virtual prop.

It is to be noted that the apparatus provided in the preceding embodiment, when implementing its functions, is exemplified merely by the division of the preceding functional modules, and in practical applications, the preceding functions may be performed by different functional modules according to needs, that is, the content structure of the device is divided into different functional modules to perform all or part of the preceding functions.

As for the apparatus in the preceding embodiment, the implementation of the execution operation of each module is described in detail in the embodiments of the method, which is not described in detail herein.

An embodiment of the present disclosure provides a computer device. The computer device includes a processor and a memory configured to store processor-executable instructions. The processor is configured to implement the steps performed by the computer device in each preceding method embodiment.

An embodiment of the present disclosure provides an animation generation system. The animation generation system includes an action capture garment, a first camera, a helmet, and a computer device.

The action capture garment is provided with multiple optical marker points.

The first camera is configured to capture the action data of the real object during the performance.

The helmet is provided with the second camera. The second camera is configured to capture the face data of the real object during the performance.

The computer device is configured to execute the steps performed by the computer device in each preceding method embodiment.

An embodiment of the present application provides a non-transitory computer-readable storage medium that stores computer program instructions. When executing the computer program instructions, a processor performs the method in each preceding method embodiment.

The present disclosure may be a system, method, and/or a computer program product. The computer program product may include a computer-readable storage medium having computer-readable program instructions embodied thereon for causing a processor to implement various aspects of the present disclosure.

The computer-readable storage medium may be a tangible device that may hold and store instructions used by an instruction execution device. The computer-readable storage medium may be, for example, but not limited to, an electrical storage device, a magnetic storage device, an optical storage device, an electromagnetic storage device, a semi-conductor storage device, or any suitable combination of the foregoing. More specific examples of the computer-readable storage medium include (non-exhaustive lists) a portable computer disk, a hard disk, a random access memory (RAM), a read-only memory (ROM), an erasable programmable read-only memory (EPROM or a flash memory), a static random-access memory (SRAM), a portable compact disk read-only memory (CD-ROM), a digital video disc (DVD), a memory stick, a soft disk, a mechanical encoding device, such as a punch card or a raised-in-recess structure having instructions stored thereon, or any suitable combination thereof. The computer-readable storage medium as used herein is not to be construed as a transient signal, such as a radio wave or other freely propagating electromagnetic waves, an electromagnetic wave propagating through a waveguide or other transmission media (for example, a light pulse through a fiber-optic cable), or an electrical signal transmitted by a wire.

The computer-readable program instructions described herein may be downloaded from the computer-readable storage medium to each computing/processing device, or downloaded to an external computer or external storage device through a network, such as the Internet, a local area network, a wide area network, and/or a wireless network. The network may include a copper transmission cable, fiber-optic transmission, wireless transmission, a router, a firewall, a switchboard, a gateway computer, and/or an edge server. A network adapter card or network interface in each computing/processing device receives computer-readable program instructions from a network and forwards the computer-readable program instructions for the storage in a computer-readable storage medium in each computing/processing device.

The computer program instructions used to perform the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages such as Smalltalk, C++, as well as conventional procedural programming languages such as C or similar programming languages. The computer-readable program instructions may be executed entirely or partially on a user computer, as a separate software package, partially on the user computer and partially on a remote computer, or entirely on the remote computer or a server. In the case where the remote computer is involved, the remote computer may be connected to the user computer via any type of network including a local area network (LAN) or a wide area network (WAN) or connected to an external computer (for example, through the Internet using an Internet service provider). In some embodiments, the status information of the computer-readable program instructions is used for personalizing electronic circuits, such as programmable logic circuits, field-programmable gate arrays (FPGAs), or programmable logic arrays (PLAs). The electronic circuits can execute computer readable-program instructions to implement various aspects of the present disclosure.

Various aspects of the present disclosure are described herein with reference to flowcharts and/or block diagrams of the method, the apparatus (system), and the computer program product according to the embodiments of the present disclosure. It is to be understood that each block in the flowcharts and/or block diagrams and a combination of blocks in the flowcharts and/or block diagrams may be implemented by the computer readable-program instructions.

These computer-readable program instructions may be provided for the processor of a general-purpose computer, a special-purpose computer, or another programmable data processing apparatus to produce a machine. Thus, these instructions executed by the processor of the computer or another programmable data processing apparatus produce an apparatus for implementing the functions/actions specified in one or more blocks in the flowcharts and/or in one or more blocks in the block diagrams. These computer-readable program instructions may also be stored in the computer-readable storage medium. These instructions cause the computer, the programmable data processing device, and/or other devices to operate in a particular manner, so that the computer-readable medium having the instructions stored thereon includes an instructing means. The instructing means includes instructions for implementing various aspects of the functions/actions specified in one or more blocks in the flowcharts and/or in one or more blocks in the block diagrams.

These computer-readable program instructions may also be loaded onto the computer, other programmable data processing apparatuses, or other devices. Thus, a series of operation steps is performed on the computer, other programmable data processing apparatuses, or other devices to produce a computer-implemented process. In this manner, instructions executed on the computer, other programmable data processing apparatuses, or other devices implement the functions/actions specified in one or more blocks in the flowcharts and/or in one or more blocks in the block diagrams.

The flowcharts and block diagrams in the drawings show possible architectures, functions and operations of the system, method and computer program product according to multiple embodiments of the present disclosure. In this regard, each block in a flowchart or block diagram may represent a module, a program segment, or part of instructions that contains one or more executable instructions for implementing specified logical functions. In some alternative implementations, the functions marked in the blocks may occur in an order different from that marked in the drawings. For example, two sequential blocks may, in fact, be executed substantially concurrently, or sometimes executed in the reverse order, which depends on the involved functions. It is to be noted that each block in the block diagrams and/or flowcharts, and combinations of blocks in the block diagrams and/or flowcharts may be implemented by not only specific-purpose hardware-based systems that perform specified functions or actions, but also combinations of specific-purpose hardware and computer instructions.

The above have described various embodiments of the present disclosure. The above description is illustrative, and not exhaustive, and not limited to the disclosed various embodiments. Without departing from the scope and spirit of the described various embodiments, various modifications and variations are apparent to those skilled in the art. The selection of terms used herein is intended to best explain the principles of the various embodiments, practical applications, or technical improvements over the technology in the market, or to enable others of ordinary skill in the art to understand the various embodiments disclosed herein.

What is claimed is:

1. An animation generation method, comprising:
acquiring real feature data of a real object, wherein the real feature data comprises action data and face data of the real object during a performance process;
determining target feature data of a virtual character according to the real feature data, wherein the virtual character is a preset animation model, and the target feature data comprises action data and face data of the virtual character; and
generating an animation of the virtual character according to the target feature data;
wherein determining the target feature data of the virtual character according to the real feature data comprises:
converting the real feature data into virtual feature data of a virtual object, wherein the virtual object is a virtual model obtained by restoring and reconstructing the real object, and the virtual feature data comprises action data and face data of the virtual object; and
redirecting the virtual feature data to obtain the target feature data of the virtual character;
wherein redirecting the virtual feature data to obtain the target feature data of the virtual character comprises:
invoking a second preset face processing model, redirecting the face data of the virtual object to obtain the face data of the virtual character, wherein the face data comprises at least one of expression data or eye expression data;
wherein the second preset face processing model is a pre-trained neural network model configured to represent a correlation between the face data of the virtual object and the face data of the virtual character;
wherein the method further comprises:
acquiring reference data, wherein the reference data comprises at least one of voice recording data of the real object during the performance process or virtual camera position and attitude data of the real object during the performance process;
wherein acquiring reference data comprises:
during the performance process, synchronously capturing a virtual camera, and recording position and attitude and movement track of the virtual camera to obtain virtual camera position and attitude data;
wherein the virtual camera position and attitude data comprises a virtual camera position, a virtual camera direction, and a focal parameter of the virtual camera;
wherein the virtual camera position and attitude data is used for indicating a preview camera viewing angle of a to-be-generated animation image;
and wherein generating the animation of the virtual character according to the target feature data comprises:
generating the animation of the virtual character according to the target feature data and the reference data.

2. The method according to claim 1, wherein the target feature data carries a time code, and the reference data carries a time code, and generating the animation of the virtual character according to the target feature data and the reference data comprises:
aligning the target feature data and the reference data according to the time code corresponding to the target feature data and the time code corresponding to the reference data; and
generating the animation of the virtual character according to the target feature data and the reference data which are aligned.

3. The method according to claim 2, wherein generating the animation of the virtual character according to the aligned target feature data and the aligned reference data comprises:
obtaining an animation image according to the virtual camera position and attitude data and the target feature data after alignment processing, wherein the virtual camera position and attitude data is used for indicating a preview camera viewing angle of a to-be-generated animation image;
rendering the animation image to obtain a rendering result; and
generating an animation video of the virtual character according to the rendering result and the voice recording data.

4. The method according to claim 1, wherein acquiring the real feature data of the real object comprises:
acquiring the action data of the real object, wherein the action data comprises at least one of limb action data or gesture action data; and
acquiring the face data of the real object, wherein the face data comprises at least one of expression data or eye expression data.

5. The method according to claim 4, wherein acquiring the action data of the real object comprises at least one of:
acquiring position data corresponding to each of a plurality of preset optical marker points on a limb of the real object and determining the limb action data of the real object according to the position data corresponding to the each of the plurality of optical marker points; or
acquiring position data corresponding to each of a plurality of preset optical marker points on a hand of the real object and determining the gesture action data of the real object according to the position data corresponding to the each of the plurality of optical marker points.

6. The method according to claim 4, wherein acquiring the face data of the real object comprises:
acquiring a face video frame of the real object, wherein the face video frame is a video frame comprising a face of the real object, and the face video frame is used for indicating the face data of the real object.

7. The method according to claim 1, wherein redirecting the virtual feature data to obtain the target feature data of the virtual character comprises:
redirecting the action data of the virtual object to obtain the action data of the virtual character, wherein the action data comprises at least one of limb action data or gesture action data; and
redirecting the face data of the virtual object to obtain the face data of the virtual character, wherein the face data comprises at least one of expression data or eye expression data.

8. The method according to claim 7, wherein redirecting the action data of the virtual object to obtain the action data of the virtual character comprises:
acquiring a first correspondence between skeleton data of the virtual object and skeleton data of the virtual character, wherein the skeleton data is used for indicating a topological structure feature of a skeleton; and
redirecting the action data of the virtual object to the virtual character according to the first correspondence to obtain the action data of the virtual character.

9. The method according to claim 7, wherein redirecting the face data of the virtual object to obtain the face data of the virtual character comprises:
acquiring a second correspondence between the face data of the virtual object and the face data of the virtual character, wherein the face data is used for indicating a facial structure feature and an emotional style feature; and
redirecting the face data of the virtual object to the virtual character according to the second correspondence to obtain the face data of the virtual character.

10. The method according to claim 1, after determining the target feature data of the virtual character according to the real feature data, further comprising:
driving and displaying skin motion of the virtual character according to the action data of the virtual character and a binding relationship between a skeleton and skin of the virtual character.

11. The method according to claim 1, before generating the animation of the virtual character according to the target feature data, further comprising:
acquiring video recording data carrying a time code, wherein the video recording data comprises video data obtained by recording performance content of the real object.

12. The method according to claim 1, further comprising:
acquiring prop motion data of a real prop used by the real object during the performance process; and
determining prop motion data of a virtual prop used by the virtual character according to the real prop data, wherein generating the animation of the virtual character according to the target feature data comprises:
generating the animation of the virtual character according to the target feature data and the prop motion data of the virtual prop.

13. An animation generation system, comprising:
an action capture garment provided with a plurality of optical marker points;
a first camera configured to capture action data of a real object during a performance;

a helmet provided with a second camera, the second camera is configured to capture face data of the real object during the performance; and a computer device configured to execute the method according to claim 1.

14. A non-transitory computer-readable storage medium storing computer program instructions, wherein when executing the computer program instructions, a processor performs the method according to claim 1.

15. A computer device, comprising a processor and a memory configured to store processor-executable instructions, wherein the processor is configured to:
- acquire real feature data of a real object, wherein the real feature data comprises action data and face data of the real object during a performance process;
- determine target feature data of a virtual character according to the real feature data, wherein the virtual character is a preset animation model, and the target feature data comprises action data and face data of the virtual character; and
- generate an animation of the virtual character according to the target feature data;

wherein determining the target feature data of the virtual character according to the real feature data comprises:
converting the real feature data into virtual feature data of a virtual object, wherein the virtual object is a virtual model obtained by restoring and reconstructing the real object, and the virtual feature data comprises action data and face data of the virtual object; and
redirecting the virtual feature data to obtain the target feature data of the virtual character;

wherein redirecting the virtual feature data to obtain the target feature data of the virtual character comprises:

invoking a second preset face processing model, redirecting the face data of the virtual object to obtain the face data of the virtual character, wherein the face data comprises at least one of expression data or eye expression data;

wherein the second preset face processing model is a pre-trained neural network model configured to represent a correlation between the face data of the virtual object and the face data of the virtual character;

wherein the method further comprises:

acquiring reference data, wherein the reference data comprises at least one of voice recording data of the real object during the performance process or virtual camera position and attitude data of the real object during the performance process;

wherein acquiring reference data comprises:

during the performance process, synchronously capturing a virtual camera, and recording position and attitude and movement track of the virtual camera to obtain virtual camera position and attitude data;

wherein the virtual camera position and attitude data comprises a virtual camera position, a virtual camera direction, and a focal parameter of the virtual camera;

wherein the virtual camera position and attitude data is used for indicating a preview camera viewing angle of a to-be-generated animation image;

and wherein generating the animation of the virtual character according to the target feature data comprises:

generating the animation of the virtual character according to the target feature data and the reference data.

* * * * *